United States Patent
Trifonov et al.

(10) Patent No.: US 7,359,514 B2
(45) Date of Patent: Apr. 15, 2008

(54) NARROW-BAND SINGLE-PHOTON SOURCE AND QKD SYSTEM USING SAME

(75) Inventors: Alexei Trifonov, Boston, MA (US); Anton Zavriyev, Swampscott, MA (US)

(73) Assignee: MagiQ Technologies, Inc., New York, NY (US)

( * ) Notice: Subject to any disclaimer, the term of this patent is extended or adjusted under 35 U.S.C. 154(b) by 183 days.

(21) Appl. No.: 11/260,705

(22) Filed: Oct. 27, 2005

(65) Prior Publication Data
US 2007/0098174 A1    May 3, 2007

(51) Int. Cl.
*H04L 9/00* (2006.01)
*H04L 9/08* (2006.01)

(52) U.S. Cl. ............ 380/256; 380/277; 380/278; 380/255

(58) Field of Classification Search ............ None
See application file for complete search history.

(56) References Cited

U.S. PATENT DOCUMENTS

| | | | |
|---|---|---|---|
| 5,659,567 A * | 8/1997 | Roberts et al. | 372/82 |
| 5,675,648 A * | 10/1997 | Townsend | 380/278 |
| 6,728,281 B1 * | 4/2004 | Santori et al. | 372/45.01 |
| 6,982,822 B2 * | 1/2006 | Teich et al. | 359/330 |
| 7,211,812 B2 * | 5/2007 | Takeuchi | 250/493.1 |
| 7,248,695 B1 * | 7/2007 | Beal et al. | 380/256 |
| 2004/0258421 A1* | 12/2004 | Conti et al. | 398/183 |

OTHER PUBLICATIONS

Single photon continuous variable quantum key distribution based on energy-time uncertainty relation—2006,□□B Qi—Arxiv preprint quant-ph/0602158, 2006—arxiv.org□□.*
Fiber-optics quantum cryptography with single photons—□□R Alléaume, JF Roch, D Subacius, A Zavriyev, A . . . —AIP Conference Proceedings, 2004—magiqtech.com□□http://magiqtech.com/research/QCMC-2004.pdf.*
Optical Quantum Information: Narrow-band Single Photons and Photon Storage, 2007 Matthias Scholz, matthias.scholzphysik.hu-berlin.de David Hoeckel, david.hoeckelphysik.hu-berlin.de http://www.physik.hu-berlin.de/nano/forschung-en/ps/index_html?set_language=en&cl=en.*
Narrow-band single-photon emission in the near infrared for quantum key distribution E Wu, Vincent Jacques, Heping Zeng, Philippe Grangier, François Treussart, and Jean-François Roch Optics Express, vol. 14, Issue 3, pp. 1296-1303 Published: Feb. 6, 2006.*

* cited by examiner

*Primary Examiner*—Syed A. Zia
(74) *Attorney, Agent, or Firm*—Opticus IP Law PLLC

(57) ABSTRACT

A narrow-band single-photon source (10) is disclosed, along with a QKD system (200) using same. The single-photon source is based on spontaneous parametric downconversion that generates signal and idler photons (PS and PI) as an entangled photon pair. Narrow-band signal photons are generated by selectively narrow-band-filtering the idler photons. This results in a non-local filtering of the signal photons due to the time-energy entanglement of the photon pair. Subsequent detection of the filtered idler photon establishes the narrow-band signal photon. The narrow-band single-photon source is particularly useful in a QKD system, wherein the narrow-band signal photons are used as quantum signals to mitigate the adverse effect of chromatic dispersion on QKD system performance.

9 Claims, 3 Drawing Sheets

NARROW-BAND SINGLE-PHOTON SOURCE AND QKD SYSTEM USING SAME

FIELD OF THE INVENTION

The present invention relates to single-photon sources, and in particular relates to a narrow-band single-photon source based on spontaneous parametric downconversion.

BACKGROUND OF THE INVENTION

A single-photon source is a device that generates light pulses having only one photon, or that generates light pulses in a manner that makes it possible to isolate a single photon in one of the light pulses without the use of attenuation. Single-photon sources are used in a number of different applications, such as metrology, where sensitive measurements are necessary. More recently, single-photon sources are being investigated as light sources for quantum cryptography, and in particular quantum key distribution (QKD) systems.

QKD involves establishing a key between a sender ("Alice") and a receiver ("Bob") by using weak (e.g., 1 photon per pulse) optical signals ("quantum signals") transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," IEEE Proceedings of the International Conference on Computers, Systems and Signal Processing, Bangalore, India, Dec. 10-12, 1984, pp. 175-179. Specific QKD systems are described in the publication by C. H. Bennett et al., entitled "Experimental Quantum Cryptography," J. Cryptology 5: 3-28 (1992), in the publication by C. H. Bennett, entitled "Quantum Cryptography Using Any Two Non-Orthogonal States", Phys. Rev. Lett. 68 3121 (1992), and in U.S. Pat. No. 5,307,410 to Bennett (the '410 patent). The general process for performing QKD is described in the book by Bouwmeester et al., "The Physics of Quantum Information," Springer-Verlag 2001, in Section 2.3, pages 27-33.

Most conventional QKD systems employ a multi-photon source, such as a laser, and attenuate multi-photon pulses to achieve single-photon quantum signals (pulses), i.e., light pulses having a mean photon number $\mu \leq 1$. This is called "weak coherent pulse" or WCP QKD. Multi-photon sources have been used to validate the compatibility of quantum communication protocols with an existing optical network. However, the pulses from an attenuated multi-photon source obey a Poisson distribution, which poses inherent difficulties for a commercially viable QKD system. First, most (typically, over ~90%) of the pulses do not contain any photons, which severely limits the transmitted data rate. At the other extreme, some of the pulses (about 10% of useful pulses) are multi-photon pulses. This allows for an eavesdropper to either intercept a pulse and analyze one of the photons in the pulse to extract information while allowing the other photons in the pulse to proceed to the other QKD station, or to re-transmit the pulse without error.

Some single-photon sources are based on spontaneous parametric down conversion, whereby two entangled photons—a signal photon and an idler photon—are emitted. A single-photon source based on spontaneous parametric down-conversion is characterized by a wide spectral bandwidth. In a QKD system that includes an optical fiber link, the optical fiber causes a timing spread amongst the signal photons of different frequency during their transmission over the optical fiber. This spreading is called "chromatic dispersion." Accordingly, single-photons with wide spectral bandwidths are not particularly useful in a practical (e.g., commercially viable) QKD system.

The precise spectrum of the down-converted photons depends on the spectral characteristics of the pump laser and the phase-matching conditions of the nonlinear media (crystal) used to form the photons. The spectrum of photons generated by spontaneous parametric down conversion is governed by group velocity mismatch and is normally a few nanometers or broader. Also, the center frequency of the emitted photons varies because the frequencies of the emitted photons can be any two frequencies that sum to the pump frequency used to pump the non-linear medium. The sum frequency spectrum of the signal and idler photons is governed by the pump spectrum and can be very narrow if a continuous-wave (CW) pump is used, while the individual photon spectrum is governed by the group velocity mismatch (of the order of 1 ps or so) and usually is broad (of the order of 10 nm or so).

The spectral bandwidth of single-photon quantum signals has an impact on the performance of a QKD system. In particular, time domain spreading of the photon's spectral bandwidth requires the use of a wider gating pulse for both detection and modulation elements. This results in an increase dark-count rate (DCR) (usually, DCR is linearly proportion to the gating pulse width), which lowers the signal to noise ratio (SNR) and translates into a shorter transmission distance for the QKD system.

For example, chromatic dispersion of a typical telecommunications single-mode (optical) fiber (SMF) at 1550 nm wavelength is D(1550 nm)=17 ps/nm·km. Assume that the single-photon source is used to generate the quantum signals and has a spectral bandwidth of ~3 nm. After quantum signal propagation through 100 km of SMF fiber, quantum signal spreading in time domain will be D(1550)=5.1 ns. This would require a gating signal pulse width of >5.1 ns, which results in a DCR increase of multiple times as compared to the original (non-dispersed) quantum signal.

There are a few approaches to solving this problem, though each has an unfortunate disadvantage. For example, one approach is to filter the quantum signal bandwidth to narrow its spectrum for transmission. However, this approach has the disadvantage of a significantly decreased efficiency of the SPS, which, in turn reduces the QKD transmission distance. Another approach is to perform chromatic dispersion compensation at the receiving QKD station. However, this inevitably introduces loss, which reduces the QKD transmission distance as well.

SUMMARY OF THE INVENTION

An aspect of the present invention is a single-photon source for a QKD system. The single-photon source employs spontaneous parametric down-conversion in a non-linear optical media, such as a nonlinear optical crystal, e.g., BBO, LiNb03, KTP, etc., in a bulk or waveguide form. Because of quasi phase matching, periodically polled media can perform especially well. A strong pump laser generates time-energy entangled photon pairs after passing through the nonlinear optical media. The signal and idler photons are separated using a wavelength-selective element, such as a dichroic mirror. One of the photons is used as a triggering signal, while the other photon is used as the quantum signal in a QKD system.

This photon pair generated by the single-photon source of the present invention is both time entangled and energy entangled ("time-energy entangled"). In an example embodiment of the invention, the shorter-wavelength photon is detected with a high-quantum-efficiency (>70-80%) single-photon detector, and the resulting electrical signal is used as a timing signal for processing the longer-wavelength signal photon. In a fiber-optic-based QKD system, the wavelength of the quantum signal photon is usually in one of the standard telecom windows (1310 nm) or the S, C, or L band (centered around 1550 nm). These bands correspond to lowest attenuation in the optical fiber link optically connection the QKD stations. At the same time, single-photon detectors (SPDs) for this wavelength have low quantum efficiency (10-20%), and high dark current. The SPDs in a QKD system typically operate in Geiger mode with a gating signal applied having a width that surrounds the expected photon arrival time. Knowing the exact time of arrival of the quantum signal photon via the timing signal generated by the detection of the idler photon allows for the gating signal to be as narrow as possible. This results in a decrease in the DCR (i.e., a reduction in SPD noise), which translates into a longer transmission distance and/or a more efficient QKD system.

Another aspect of the invention is a single-photon source that includes a pump light source that generates pump light, and a non-linear medium arranged to receive the pump light and generate time-energy entangled signal and idler photons having respective first and second wavelengths and corresponding first and second spectral bandwidths. The single-photon source also includes a wavelength-selective member arranged to receive the signal and idler photons and direct the photons along respective first and second optical paths. A narrow-band optical filter having a select spectral bandwidth is arranged along the second optical path so as to filter the idler photons (i.e., the ones that are used as triggering signals) so that only narrow-band idler photons pass therethrough. Also, a single-photon detector is arranged downstream of the optical filter and is adapted to detect each narrow-band idler photon that passes through the optical filter. The filtering and detecting of the narrow-band idler photons causes a corresponding amount of non-local filtering of corresponding signal photons via the time-energy entanglement, so as to create narrow-band signal photons.

Figure 1:
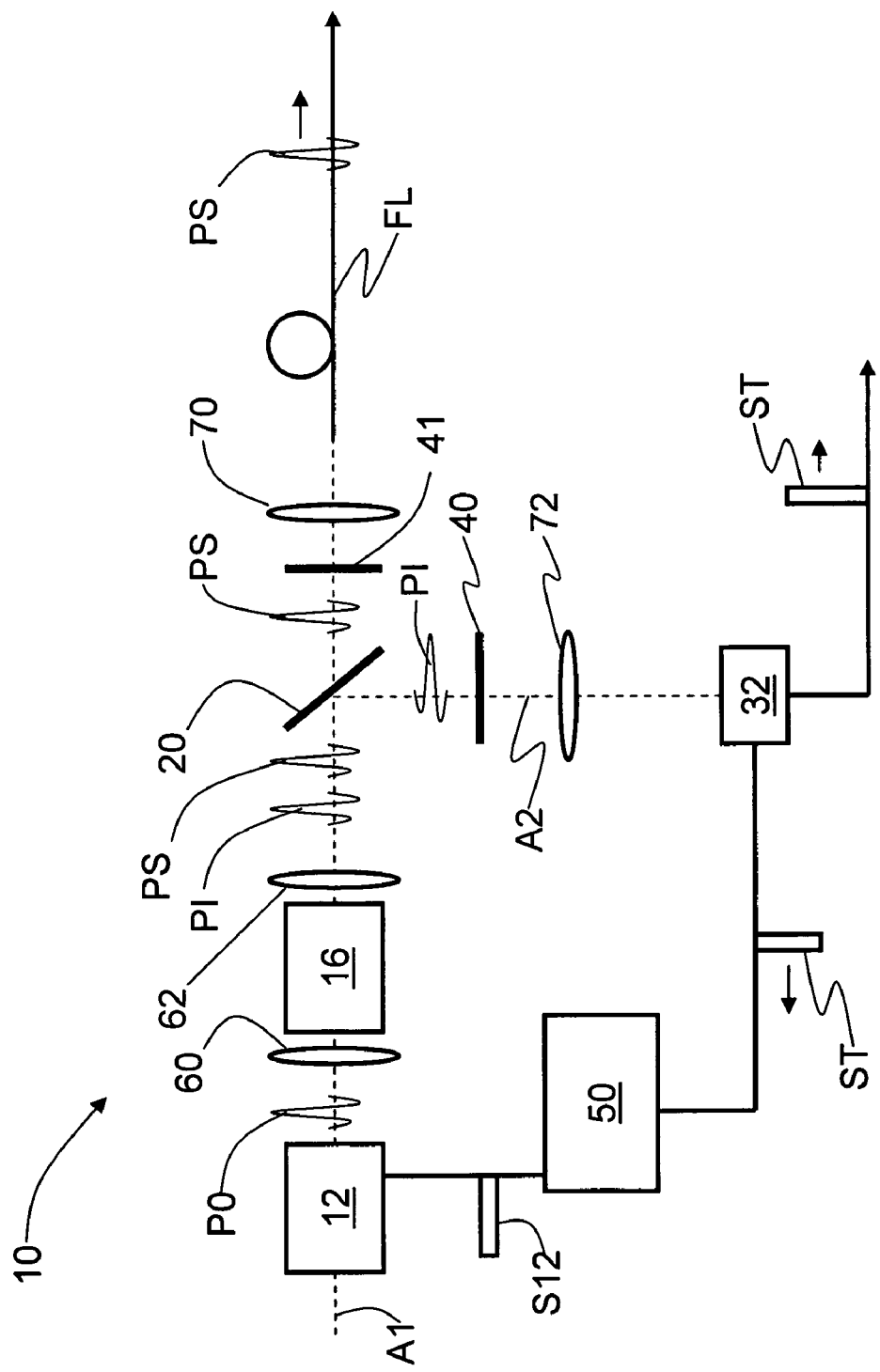
FIG. 1 is a schematic diagram of a generalized example embodiment single-photon source according to the present invention.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art. Like elements are given like reference numbers.

DETAILED DESCRIPTION OF THE INVENTION

The present invention is a narrow-band single-photon source (SPS) based on spontaneous parametric down-conversion. The single-photon source generates narrow spectral band first photons by taking advantage of the time-energy entanglement of the photon pairs by filtering the second photons, rather than the usual approach of trying to filter or otherwise alter the first photons directly.

SPS Generalized Example Embodiment

FIG. 1 is a schematic diagram of a generalized example embodiment of a narrow-band single-photon source (SPS) 10 according to the present invention. Single-photon source 10 includes a pump light source 12 optically coupled to an optically non-linear medium 16 along an optical axis A1. Pump light source is typically a laser. Non-linear medium 16 is, for example, a nonlinear optical crystal, e.g. BBO, or periodically polled waveguide (e.g. LiNbO3, or a KTP). A wavelength-selective member 20, such as a dichroic beam splitter, is arranged along axis A1 downstream of non-linear medium 16 so as to be optically coupled thereto. Wavelength-selective member 20 creates an additional optical axis A2 different from (e.g., orthogonal to) optical axis A1. Axes A1 and A2 represent different optical paths over which the signal and idler photons travel.

A single-photon detector (SPD) 32 is arranged along optical axis A2 so as to be optically coupled to wavelength-selective element 20. A narrow-band optical filter 40 is arranged along optical axis A2 between SPD 32 and wavelength-selective element 20. In an example embodiment, narrow-band optical filter 40 is incorporated into or otherwise formed integral with wavelength-selective element 20, e.g., as a thin-film coating. In an example embodiment, narrow-band optical filter 40 is a thin-film-based filter. In an example embodiment, narrow-band optical filter 40 has a center wavelength of ~810 nm and a bandwidth of ~0.1 nm.

A controller 50 is operably coupled to pump light source 12 and SPD 32 and is adapted to control the operation of single-photon source 10. Also shown in FIG. 1 is an optical fiber link FL optically coupled to wavelength-selective element 20.

In an example embodiment, single-photon source 10 includes focusing and collecting lenses 60 and 62 arranged along optical axis A1 on opposite sides of non-linear medium 16 to respectively focus the pump light from the pump laser and to collect light leaving non-linear medium 16. Likewise, in an example embodiment, single-photon source 10 includes a focusing lens 70 arranged along optical axis A1 between wavelength-selective element 20 and optical fiber link FL to couple light into the optical fiber link. Also in an example embodiment, a focusing lens 72 is arranged along optical axis A2 between wavelength-selective element 20 and SPD 32 to focus light onto the SPD.

With continuing reference to FIG. 1, in the operation of narrow-band single-photon source 10, controller 50 activates pump light source 12 via a control signal S12. In response thereto, pump light source 12 emits pump light (CW or pulsed) shown as a light pulse P0 that travels down optical axis A1 to non-linear medium 16. In response thereto, non-linear medium might generate a pair of entangled photons PS and PI, wherein PS is the signal photon and PI is the idler photon. Here, the terminology "signal" and "idler" (or alternatively, "first" and "second") is used to describe the respective photons in a given photon pair. Other terminology, such as "heralded" and "heralding" is also used in the art to describe the two photons in the photon pair.

In an example embodiment, the pump light pulse P0 has a wavelength of ~532 nm, the signal photon PS has a wavelength of ~1550 nm and the idler photon PI has a wavelength of ~810 nm. In another example embodiment, signal photon PS has a wavelength in the 1310 nm band or the S, C, L band (~1500-1600) nm.

Photons PS and PI travel down optical axis A1 and are separated by wavelength-selective element 20. In this embodiment the idler photon PI travels down optical axis A2 while the signal photon PS continues along axis A1. Signal photon PS is then coupled into optical fiber link FL and travels down the optical fiber. Meanwhile, idler photon PI encounters narrow-band filter 40.

Now, photons PS and PI are time-energy entangled through the spontaneous parametric downconversion process that created them. If the frequency of the pump photons P0 is $\omega_P$ and the frequencies of the signal and idler photons PS and PI are $\omega_S$ and $\omega_I$, respectively, then the pump frequency is related to the signal and idler photon frequencies via the relationship $\omega_P = \omega_S + \omega_I$. In the wavelength domain, energy conservation dictates that the spectral bandwidth $\Delta\lambda_I$ is given by $$\Delta\lambda_I = \Delta\lambda_S(\lambda_I^2/\lambda_S^2) \qquad \text{EQ. 1}$$

Only those idler photons PI having a spectral bandwidth that matches narrow-band optical filter 40 make it through the filter. The idler photons PI that make it through filter 40 are detected by SPD 32, which generates a trigger signal ST for each detected photon. Because the signal and idler photons are entangled, the detection of an idler photon PI establishes the existence of signal photon PS. Further, in an example embodiment, trigger signal ST is used to process signal photon PS, as described below in connection with the use of single-photon source in a QKD system. In an example embodiment, trigger signal ST is also sent to controller 50, which stores the timing information represented by this signal.

Because the idler and signal photons are time-energy entangled, the signal photons PS that are the counterparts to the detected idler photons also have a correspondingly narrow spectral bandwidth as determined by equation (1), above. Furthermore, since signal photons PS are never directly spectrally filtered, their transmission is not affected, i.e., the conditional mean photon number in a QKD pulse does not change. The filter loss only affects the detectable pair generation rate. In the QKD system embodiment discussed below, this minimizes the SNR at Bob.

More particularly, the spectrum of photons generated by spontaneous parametric down conversion is governed by group velocity mismatch and is normally of few nanometers or broader. As discussed above, chromatic dispersion in optical fibers prohibits the use of relatively large-spectral-bandwidth single-photons in a practical QKD system. However, the present invention achieves transform-limited filtering of the signal photons PS to obtain a desired frequency spectrum for these photons by filtering the idler photons PI. This is possible because the signal and idler photons are entangled in the time-frequency domain. In particular, the idler photon PI (having a wavelength, e.g., of ~810 nm) is passed through the narrow-band spectral filter 40 (e.g., of the order of 0.1 nm or so), while the signal photon PS has a wavelength of say ~1550 nm. Due to entanglement of the photon pair, the signal and idler photons PS and PI are correlated in frequency (i.e., are entangled in time-frequency domain). For this reason, filtering the idler photons PI results in the conditional and non-local filtering of signal photons PS (having a wavelength, e.g., of 1550 nm). The idler photon filtering serves to narrow the spectrum of the signal photon by an amount correspond to the filtering applied to the idler photon (again, the spectral bandwidths of the two photons are related by equation (1)). By way of example, in the case of a ~0.1 nm narrow-band spectral filter 40 centered about ~810 nm, the effective non-local filtering of the ~1550 nm signal photon is ~0.4 nm. In a specific example, a 0.12 nm narrow band spectral filter 40 centered on 810 nm provides filtering at 1550 nm of 0.44 nm. In a general example embodiment, narrow-band filter has a bandwidth so as to provide filtering of the signal photon PS in the range between about 0.2 and about 0.8 nm.

In an example embodiment, direct filtering is also applied to signal photons PS using a filter 41 having a central frequency complimentary to that of filter 40 (e.g., centered on a wavelength of 1550 nm when filter 40 is centered on a wavelength of 810 nm), and having a relatively large bandpass (e.g., 1.2 nm). This filtering is directed to ensuring that there are not too many uncorrelated photons in optical fiber link FL. The main filtering is done on idler photon PI, so that the spectral shape of the signal photon PS is governed by narrow-band filter 40, and not filter 41.

Second SPS Embodiment

Figure 2:
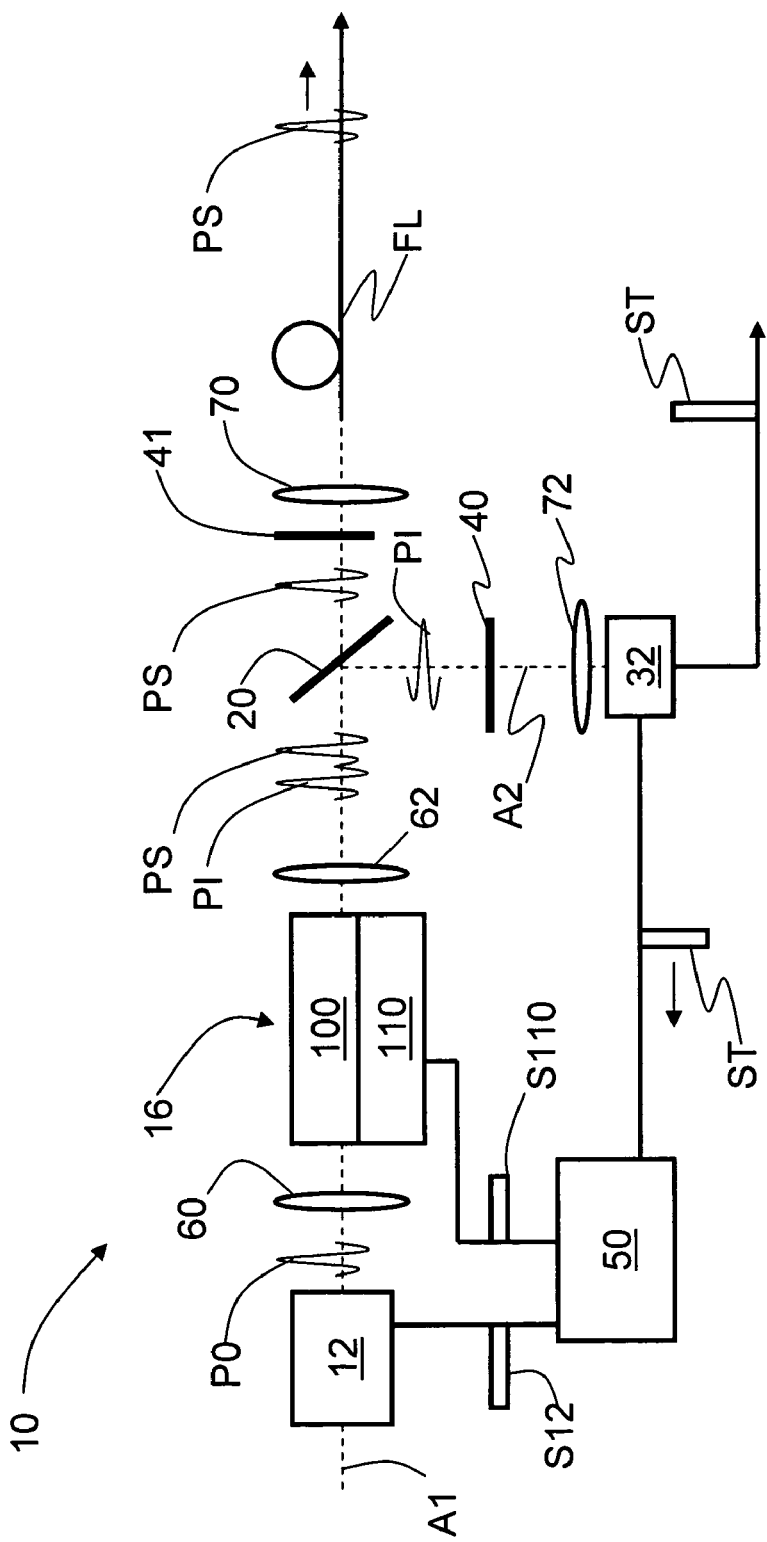
FIG. 2 is the schematic diagram an example embodiment of a single-photon source according to FIG. 1, wherein the non-linear medium is in the form of a periodically poled waveguide in thermal communication with a temperature controller.

FIG. 2 is an example embodiment of a single-photon source according to FIG. 1, wherein non-linear medium 16 is in the form of a periodically poled waveguide 100 in thermal communication with a temperature controller 110. Temperature controller 110 is operably coupled to controller 50 and is controlled thereby via a control signal S110 in order to optimize conversion efficiency of the pump pulse P0 into signal and idler photons PS and PI.

QKD System with SPS

Figure 3:
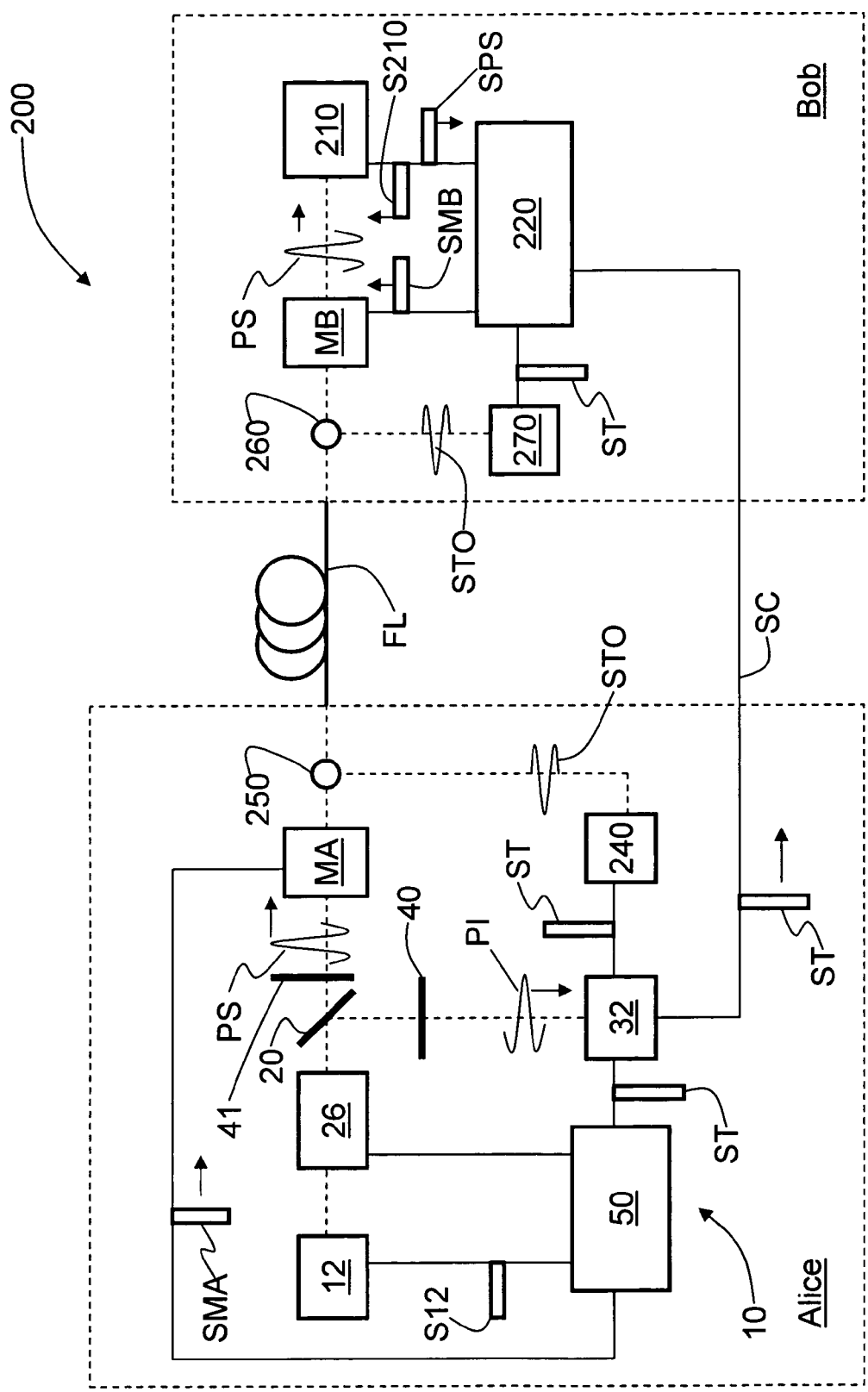
FIG. 3 is a schematic diagram of a QKD system that includes the single-photon source of the present invention.

FIG. 3 is a schematic diagram of a QKD system 200 that includes the narrow-band single-photon source 10 of the present invention. QKD system 200 includes a first QKD station Alice optically coupled to a second QKD station Bob via optical fiber link FL. In addition to single-photon source 10, Alice includes a modulator MA operably coupled to the controller and adapted to impart a randomly selected modulation (polarization or phase) from a set of modulation bases to light passing therethrough. This operation is referred to herein as "selective random modulation." Modulator MA is controlled via a timed control signal SMA from controller 50.

Bob includes a modulator MB similar to Alice's modulator MA and optically coupled to optical fiber link FL, and a single-photon detector (SPD) unit 210 optically coupled to modulator MB. Bob also includes a controller 220 operably coupled to modulator MB and SPD unit 210. Bob's controller 220 and Alice's controller 50 are operably coupled by a synchronization channel SC that supports a synchronization signal in the form of trigger signal ST that is used to coordinate the timed operation of QKD system as a whole, including Bob's modulator MB.

In an example embodiment of the operation of QKD system 200, time-energy entangled photons PS and PI are generated as described above. Also as described above, idler photon PI proceeds toward narrow-band filter 40, while signal photon PS serves as the quantum signal. Photon PS is selectively randomly modulated by modulator MA, which is timed to the expected arrival time of signal photon PS. Signal photon PS is then coupled into optical fiber link FL and proceeds over to Bob.

Meantime, back at Alice, idler photon PI encounters narrow-band filter 40. Narrow-band filter 40 only passes those idler photons PI having the wavelength and spectral bandwidth of the filter, ensuring that only narrow-bandwidth photons with a select frequency are detected by SPD 32. As discussed above, the detection of an idler photon PI collapses the state of signal photon PS by virtue of their entanglement. Detector 32 generates trigger signal ST that is sent over to Bob and is used to control the timing of modulator MB and SPD unit 210. In an example embodiment, trigger signal ST is sent over an electronic synchronization (sync) channel SC and that couples Alice's controller 50 to Bob's controller 220, Controller 220, in response to trigger signal ST, generates timing signals SMB and S220 for modulator MB and SPD unit 210 in order to selectively randomly modulate and detect (quantum) signal photons PS.

In another example embodiment, trigger signal ST is converted to an optical signal STO via a phototransmitter 240 at Alice. Optical signal STO is then multiplexed onto optical fiber link FL via a multiplexer 250. Optical signal STO is then demultiplexed at Bob at a demultiplexer 260 and is converted back to electrical signal ST by a photoreceiver 270. Electrical signal ST is then received and processed by Bob's controller 220, which then generates timing signals SMB and S220 for modulator MB and SPD unit 220 in order to selectively randomly modulate and detect (quantum) signal photons PS.

The twice-modulated signal photons PS are detected by SPD unit 210, which generates a signal (click) SPS for each detected signal photon PS. Signal SPS is representative of the overall modulation imparted to signal photons PS. For example, SPD unit 210 may have two SPDs (not shown) that are respectively arranged to yield a click for each of two different overall phase modulation states.

Once a suitable number of photons have been exchanged, Alice's and Bob's controllers 50 and 220 then communicate and process the information stored therein relating to the various modulation states used for each exchanged photon. A common quantum key is ultimately established between the Alice and Bob using known methods such as sifting, error correction, privacy amplification, etc.

QKD system 200 with narrow-band single-photon source 10 benefits from the use of narrow-band quantum signals in the form of signal photons PS because the impact of chromatic dispersion on the quantum signals is mitigated. Also, knowing the exact time of arrival of the quantum signal photon via the trigger signal ST generated by the detection of the idler photon allows for the timing and gating signals to be as narrow as possible. This results in a decrease in the DCR (i.e., a reduction in SPD noise), which translates into a longer transmission distance and/or a more efficient QKD system.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention.

Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A system for generating narrow-band single photons, comprising:
    a pump light source that generates pump light;
    a non-linear medium arranged to receive the pump light and generate time-energy entangled signal and idler photons having respective first and second wavelengths and corresponding first and second spectral bandwidths;
    a wavelength-selective member arranged to receive the signal and idler photons and direct the photons along respective first and second optical paths;
    a narrow-band optical filter having a select spectral bandwidth and arranged along the second optical path so as to filter the idler photons so that only narrow-band idler photons pass therethrough;
    a single-photon detector arranged downstream of the optical filter and adapted to detect each narrow-band idler photon that passes through the optical filter; and
    wherein said filtering and detecting of the narrow-band idler photons causes a corresponding amount of non-local filtering of corresponding signal photons via said time-energy entanglement, so as to create narrow-band signal photons.

2. The system of claim 1, wherein the narrow-band optical filter is either formed integral with or is incorporated into the wavelength-selective member.

3. The system of claim 1, wherein the narrow-band optical filter is centered on a wavelength of about 810 nm and has a bandwidth of about 0.1 nm.

4. The system of claim 3, wherein the signal photons have a central wavelength of about 1550 nm.

5. A method of forming narrow-band single photons, comprising:
    generating pairs of first and second entangled photons via spontaneous parametric downconversion;
    separating the first and second photons to travel along different optical paths;
    narrow-band-filtering the second photons by passing the second photons through a narrow-band filter having a center wavelength and a spectral bandwidth between about 0.2 nm and about 0.8 nm;
    detecting the narrow-band-filtered second photons so as to establish the first photons as a narrow-band single photons; and
    generating trigger signals from the detected narrow-band-filtered second photons for processing the narrow-band signal photons.

6. The method of claim 5, wherein the narrow-band-filter center wavelength is about 810 nm and the narrow-band-filter bandwidth is about 0.1 nm.

7. The method of claim 5, wherein the narrow-band filtering of the second photons is carried out so as to form first single photons having a wavelength of about 1550 nm and a first-single-photon spectral bandwidth of about 0.4 nm.

8. A QKD system comprising:
    a) first and second QKD stations optically coupled by an optical fiber link, the first QKD station having:
        i) single-photon source means for generating narrow-band first photons and a corresponding trigger signal based on detecting idler photons;

ii) a first modulator optically coupled to the single-photon source means and the optical fiber link and adapted to randomly modulate the narrow-band first single photons based on select basis modulations;

b) wherein the second QKD station includes:
  i) a second modulator timed by the trigger signal and optically coupled to the optical fiber link, the second modulator adapted to receive and modulate the once-modulated first single-photons to form twice-modulated first single photons; and
  ii) a single-photon detector unit adapted to detect the twice modulated first single photons and generate clicks representative of modulation states of the twice-modulated first single photons.

9. A method of modulating single-photons in a quantum key distribution (QKD) system, comprising:

a) generating narrow-band single-photon quantum signals by:
  i) generating pairs of first and second entangled photons via spontaneous parametric downconversion;
  ii) narrow-band-filtering the second photons; and
  ii) detecting the narrow-band-filtered second photons so as to establish the first photons as a narrow-band single-photon quantum signals;

b) generating a trigger signal for each detected second photon;

c) selectively randomly modulating the quantum signals at a first QKD station; and d) transmitting the once-modulated quantum signals to a second QKD station and selectively randomly modulating the once-modulated quantum signals therein using the trigger signal to time the modulation at the second QKD station.

* * * * *